United States Patent [19]

Kögler et al.

[11] 4,286,184

[45] Aug. 25, 1981

[54] ELECTRONIC MOTOR HAVING A MULTI-POLE EXTERNAL ROTOR

[75] Inventors: Georg Kögler; Hans Kühnlein; Karl Schalk, all of Nuremberg, Fed. Rep. of Germany

[73] Assignee: Siemens Aktiengesellschaft, Munich & Berlin, Fed. Rep. of Germany

[21] Appl. No.: 91,831

[22] Filed: Nov. 6, 1979

[30] Foreign Application Priority Data

Nov. 21, 1978 [DE] Fed. Rep. of Germany ....... 2850478

[51] Int. Cl.³ .............................................. H02K 11/00
[52] U.S. Cl. ................................ 310/67 R; 310/68 B; 310/156; 318/254
[58] Field of Search ................. 310/68 R, 68 B, 68 E, 310/67, 156, 152; 318/138, 254

[56] References Cited

U.S. PATENT DOCUMENTS

| | | | |
|---|---|---|---|
| 3,644,765 | 2/1972 | Janson | 310/68 R |
| 3,969,644 | 7/1976 | Nowak | 310/152 |
| 4,086,519 | 4/1978 | Persson | 310/68 B |
| 4,115,715 | 9/1978 | Müller | 310/67 X |
| 4,211,963 | 7/1980 | Müller | 318/254 |

*Primary Examiner*—Donovan F. Duggan
*Attorney, Agent, or Firm*—Kenyon & Kenyon

[57] ABSTRACT

An electronic motor has a multi-pole external rotor and a multi-slot stator which is rotatable inside the external rotor. At least two magnetic field sensing elements are arranged in the vicinity of the external rotor and current supply to the stator windings is provided by a commutation device. The prior art stator was provided with obliquely set stator winding slots and involved a complicated winding technique. To eliminate this disadvantage and to be able to use slots lying parallel to the axis, the neutral field lines between each north and south pole of the external rotor are made to lie parallel to the rotor axis in the region of the magnetic field sensing elements and obliquely thereto in the region of the laminated rotor stack.

3 Claims, 2 Drawing Figures

ELECTRONIC MOTOR HAVING A MULTI-POLE EXTERNAL ROTOR

BACKGROUND OF THE INVENTION

This invention relates to a commutatorless electronic motor having a multi-pole external rotor comprising a magnet body having north and south poles and revolving about a rotor axis, in which a multislot stator is fixed inside the external rotor, and in which at least two magnetic field sensing (magnetic-field-sensitive structural) elements are radially disposed between the magnet body and a flux return part fixed in the vicinity of the external rotor. As the rotor revolves, the magnetic field sensing elements furnish signals dependent on the angular position of the rotor to an electronic commutation device to which the signals are supplied and which is provided for current supply to the stator windings.

As electronic motor of this kind, having an external rotor, is described in the journal "Elektrodienst," volume 20 (1978), Special Issue "Standard Products," at page 11. This is a collectorless DC motor with electronic commutation which is distinguished by especially quiet running. Because the electronic motor may have a relatively low axial height, it has particular utility in flat components having direct drives, such as, for instance, video cassette recorders.

In the known electronic motor, the rotor is provided with permanent magnet poles and revolves externally about the stator. The external rotor has a hollow, cylindrical permanent magnet body surrounded by a metallic rotor cup. The magnet body may, in particular, be formed of magnetic rubber and is firmly seated against the inner wall of the rotor cup. The stationary stator consists of a cylindrical stack of laminations which is provided with slots extending obliquely to the rotor axis. The current flows through stator windings which are placed in the slots of the stator. The stator windings are energized by an electronic commutation device as a function of the rotor position in such a way that a rotary circulation results. Two magnetic field-sensing elements fixed on a support plate, namely two Hall generators, are used as position signalizers. They are mutually offset spatially and electrically in the vicinity of the end face of the rotor cut. They protrude from the support plate into an annular groove provided in the end face of the rotor cup. Thus, viewed in radial direction from the rotor axis, there results a succession in space of the permanent magnet body, a Hall generator, and the lower end of the rotor cup, which thus acts as magnetic flux return. The rotor position-dependent signals delivered by the Hall generator are supplied to the mentioned commutation device. The external rotor may have a relatively large number of poles. For instance, there may be a 12- or 16- pole external rotor and a 24- or 32- slot stator.

As mentioned before, the slots in the prior art lamination stack extend obliquely to the rotor axis. The magnet body of the external rotor has a magnetization where—seen in circumferential direction of the hollow cylindrical permanent magnet body—north and south poles alternate regularly. The neutral field lines between each north pole and the adjacent south pole are parallel to the rotor axis. The combination of slanting slots and magnetization with neutral field lines parallel to the axis has been chosen because of the requirement for an especially quiet running electronic motor.

The known commutatorless DC motor has the advantage that an axial displacement of the rotor relative to the stator has practically no influence on the magnitude of the Hall voltage of the two Hall generators. Also, the two Hall generators may be mutually displaced in the axial direction by a small distance without the need to provide for different Hall voltages. This property of the electronic motor saves special adjusting work in manufacture. On the other hand, however, the prior art motor has the disadvantage that, because of the oblique slots, a complicated winding technique must be used and the copper filling factor is relatively small.

It is an object of the invention to simplify the manufacture of an electronic motor of the above mentioned kind while providing a structure that is equally quiet in running and equally insensitive to errors in installing the magnetic field sensing elements, such as offset in the axial direction.

BRIEF DESCRIPTION OF THE INVENTION

The above problem is solved, according to the invention, by arranging for the neutral field lines between a north pole and a south pole of the external rotor to extend parallel to the rotor axis in the region of the magnetic field sensors, and to extend obliquely to the rotor axis in the region of the laminated stack of the stator. The external rotor thus has two regions with different orientations of magnetization.

In the electronic motor of the invention, it is possible and desirable to align the slots in the lamination stack of the stator parallel to the rotor axis. This results in a simplified manufacture of the stack, in a simplification in winding the stator windings, and lastly, also, in a reduction of the manufacturing cost, without having to fear that the advantageous properties of the motor, namely, quiet running, low axial height, and simple, installation, would be impaired.

A further advantage, which permits of an especially simple installation, results when the mentioned known electronic motor, where the magnetic field sensitive elements are disposed on a support plate and protrude into an annular groove provided on the end face of the external rotor, is taken as a basis. This feature of the invention consists in providing that the lengths of the neutral flux lines lying parallel to the axis correspond approximately to the depth of the annular groove. Thereby only the absolutely necessary part of the external rotor is magnetized exactly in circumferential direction. Since the individual magnetic field sensitive element, or sensor, is usually quite a bit smaller than the annular groove, correct adjustment is achieved, when installing these elements, merely by attaching them to the support plate. To avoid readjustment, it is a further feature of the invention that the length of field lines lying parallel to the axis corresponds, approximately, to double the width of one of the magnetic field-sensing elements. In the embodiment just mentioned which has the annular groove, either a co-rotating flux return part, e.g. a rotor cup, or a fixed flux return part may be used.

In the electronic motor of the invention, therefore, the external rotor is provided with two regions having different orientations of magnetization and different alignments of the neutral flux lines. The magnetic field sensing element are arranged in the region having neutral flux lines parallel to the axis, this region being wider than the associated magnetic field sensing element. Owing to this, no displacement of the current flow angles can result from installation of two magnetic field sensing elements at points differing in the axial direction and, hence, faulty control of the electronic motor resulting from the displacement of the current flow angles cannot result from installation of two magnetic field sensing elements at points differing in the axial direction and, hence, there can be no faulty control of the electronic motor resulting from the displacement. Thus, also, a warping of the Hall generator support plate due to heating or aging has no effect on the adjustment of the current flow angle. The need to specify high accuracy placement of the magnetic field sensing elements, and the need, in particular, for separate parts having narrow tolerances and requiring careful installation is also reduced, resulting in a substantial saving in cost. The arrangement assures, that, in the region of the laminated stator stack, the neutral flux lines in the external rotor are oblique to the rotor axis. In this way considerable quietness of the electronic motor is ensured, even though the slots are aligned parallel to the rotor axis.

BRIEF DESCRIPTION OF THE DRAWINGS

An embodiment of the invention will be explained in greater detail below with reference to two figures in which.

DETAILED DESCRIPTION OF THE INVENTION

Figure 1:
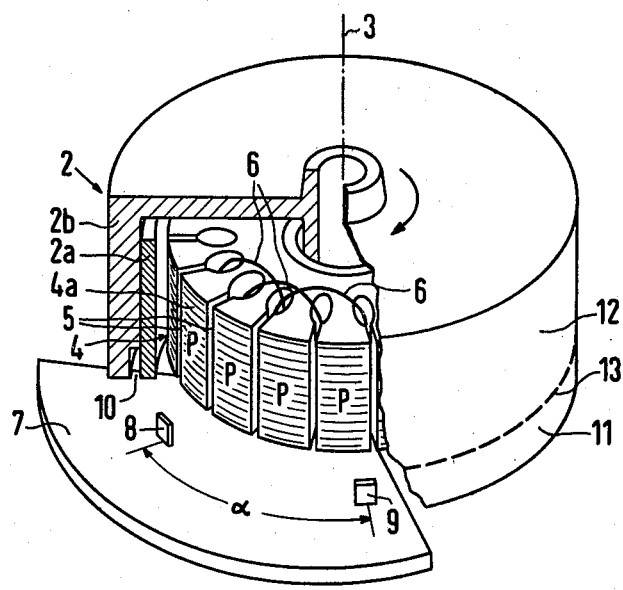
FIG. 1 is a side view, partly broken open and in partial cross-section, of the mechanical part of an electronic motor according to the invention.

According to FIG. 1, the electronic motor comprises a multi-pole external rotor 2 revolving about a rotor axis 3. External rotor 2 consists of a hollow cylindrical permanent magnet body 2a and a metallic rotor cup 2b. Permanent magnet body 2a, which may be made of magnetic rubber, is fastened to the inner wall of rotor cup 2b. Cup- or bell-shaped external rotor 2 rotates over a stationary stator 4. Stator 4 consists of a laminated stack 4a having a plurality of slots 5. Slots 5 run parallel to the rotor axis 3. The poles P lie between the various slots 5. In operation, current flows through stator windings 6, shown in simplified form, which are placed in slots 5. By a commutation device (not shown), the current is fed to and distributed over the various stator windings 6 in such a way that a rotary circulation and, hence, a torque result.

On the lower end face of external rotor 2, there is a stationary support plate 7 which carries two magnetic field sensing elements 8 and 9 which may be Hall generators. Elements 8 and 9 have between themselves, as referred to rotor axis 3, an angular distance α. External rotor 2 itself contains, on the lower end face of rotor cup 2b, an annular groove 10. The two magnetic field sensing elements 8 and 9 protrude into it. Annular groove 10 is bounded, on the inside, by permanent magnet body 2a, and, on the outside, by the other end of the rotor cup 2b, which acts as the flux return part.

The commutation device used with the motor may be constructed as shown in the journal "Elektrodienst" 20 (1978), Special Issue "Standard Products" page 11, FIG. 3.

The electronic motor described up to this point is known. The difference now is that the multipole external rotor 2, more exactly permanent magnet body 2a, has two regions 11 and 12 in which the direction of magnetization is different. The horizontal line which divides regions 11 and 12 is dashed and is designated by 13. Dividing line 13 is placed approximately at a level corresponding to the depth of annular groove 10. As is evident from FIG. 2, external rotor 2 is so magnetized that neutral field lines 11a lie parallel to rotor axis 3 in region 11, and that oblique neutral field lines 12a lie obliquely, thereto, in region 12. In this way, independence of current flow angle from variation in the mutual displacement, in the axial direction of magnetic field sensing elements 8 and 9, is achieved.

Figure 2:
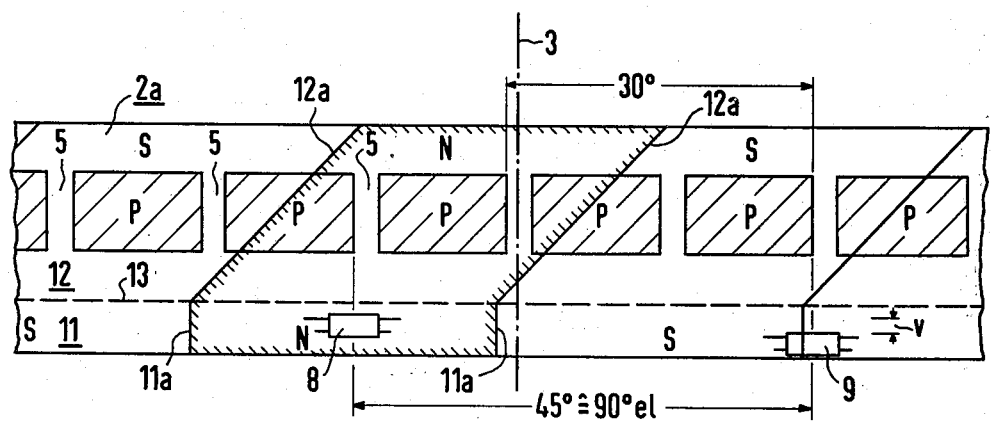
FIG. 2 is a schematic drawing showing the development of a portion of the multi-pole external rotor and of the stator pole system.

In the developed view of FIG. 2 it has been assumed, as an example, that permanent magnet body 2a has a total of six pole pairs N, S. North poles N and south poles S are spatially separated from each other by 30°. Viewed in circumferential direction, that is, in a sight direction normal to rotor axis 3, each south pole S is succeeded by a north pole N. For each pole N or S, there are two regions which are separated by separating line 13. In region 11, which is associated with elements 8 and 9, neutral lines 11a run parallel to rotor axis 3 between north pole N and south pole S. In region 12, associated with lamination stack 4, neutral lines 12a run obliquely to rotor axis 3 between north pole N and south pole S. One north pole N is especially emphasized in FIG. 2 by hatching of its boundary lines, so that neutral lines 11a, 12a can be seen more clearly. To bring out the spatial correlation, FIG. 2 also shows the developed stator pole system having poles P and slots 5 therebetween. Also, it can be seen that the two magnetic field sensing elements 8 and 9 are offset from each other by an angle alpha=45° (corresponding to 90° el). The centers of elements 8 and 9 each lie under the right edge of a pole P. The electrical angle is, in more general terms, 90° el ±n ×180° el, with n=1, 2, 3 ..., and here specifically, n=1.

It is evident from FIG. 2 that the illustrated offset v between the two magnetic field sensing elements 8 and 9 in the axial direction as to each other and as against the stator pole system having poles P, has no influence on the current flow angle. In other words; although a mutual offset v exists, Hall generator 9 is immune to it and delivers, when uniformly rotated, a signal shifted exactly 90° el, relative to Hall generator 8.

It can be seen that the axial width of magnetic field sensing elements 8 and 9 is about half that of the axial width of lower region 11.

It is to be noted, also, that a possible azimuthal shift of magnetic field sensing elements 8 and 9, relative to the stator system having poles P, can be compensated by displacement of the complete stator 4 in the axial direction, relative to external rotor 2.

The increased cost of manufactue of a device for magnetizing external rotor 2 with neutral field lines 11a parallel to the axis, as well as with neutral field lines 12a oblique thereto is small, by comparison with the savings that result from the simple arrangement of slots 5 parallel to the motor axis and the resulting simple winding technique required.

What is claimed is:

1. In an electronic motor having a multipole external rotor comprising a magnet body having north and south poles and adapted to revolve about a rotor axis, a multislot stator fixed inside the external rotor, and at least two magnetic field sensing elements radially disposed between the magnet body and a flux return part and fixed near by the external rotor, the sensing elements furnishing signals dependent on the angular position of the rotor to an electronic commutation device for feeding current to the stator windings, the improvement comprising:

the north and south poles of the external rotor being separated by neutral field lines lying parallel to the rotor axis in the region of the magnetic field sensing elements and obliquely to the rotor axis in the region of the laminated stack of the stator.

2. In an electronic motor according to claim 1 in which the magnetic field sensing elements are arranged on a support plate and protrude therefrom into an annular groove provided on the end face of the external rotor, and in which the groove is formed by the cylindrical magnet body and a rotor part which is cup shaped and surrounds the latter, acting as magnetic flux return part, the further improvement comprising:

the length of the neutral field lines lying parallel to the axis being approximately the same as the depth of annular groove.

3. In an electronic motor according to claim 1 or claim 2, the further improvement comprising the length of the neutral field lines parallel to the axis corresponding to approximately double the width of one magnetic field sensitive element.

* * * * *